United States Patent
Dawson et al.

(10) Patent No.: US 10,594,623 B2
(45) Date of Patent: Mar. 17, 2020

(54) MARKET-DRIVEN VARIABLE PRICE OFFERINGS FOR BANDWIDTH-SHARING AD HOC NETWORKS

(71) Applicant: INTERNATIONAL BUSINESS MACHINES CORPORATION, Armonk, NY (US)

(72) Inventors: Christopher J. Dawson, Arlington, VA (US); Peter G. Finn, Ontario (CA); Rick A. Hamilton, II, Charlottesville, VA (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 15/008,910

(22) Filed: Jan. 28, 2016

(65) Prior Publication Data
US 2016/0149830 A1 May 26, 2016

Related U.S. Application Data

(63) Continuation of application No. 11/755,800, filed on May 31, 2007.

(51) Int. Cl.
*G06Q 30/08* (2012.01)
*H04L 12/915* (2013.01)
(Continued)

(52) U.S. Cl.
CPC .......... *H04L 47/787* (2013.01); *G06Q 30/08* (2013.01); *H04W 72/04* (2013.01); *H04W 84/18* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS

| 5,390,113 A | 2/1995 | Sampson |
| 5,437,054 A | 7/1995 | Rappaport et al. |

(Continued)

FOREIGN PATENT DOCUMENTS

| EP | 0999662 | 5/2005 |
| WO | 09915960 | 4/1999 |

(Continued)

OTHER PUBLICATIONS

Office Action dated Jun. 27, 2016, in U.S. Appl. No. 14/674,653; 16 pages.

(Continued)

*Primary Examiner* — Frantzy Poinvil
(74) *Attorney, Agent, or Firm* — Brian Restauro; Andrew M. Calderon; Roberts Mlotkowski Safran Cole & Calderon P.C.

(57) ABSTRACT

Systems and methods to establish and execute market-driven variable price offerings among the lenders and borrowers in a bandwidth-sharing ad hoc network for shared bandwidth usage. The method comprises establishing and executing market-driven variable price offerings among lenders and borrowers. A bandwidth-sharing ad hoc network for shared bandwidth usage is formed based on the established and executed market-driven variable price offering.

20 Claims, 8 Drawing Sheets

(51) Int. Cl.
*H04W 72/04* (2009.01)
*H04W 84/18* (2009.01)

(58) Field of Classification Search
USPC .................................................. 705/3–44
See application file for complete search history.

(56) References Cited

U.S. PATENT DOCUMENTS

| | | | |
|---|---|---|---|
| 5,490,201 A | 2/1996 | Moberg et al. |
| 5,953,338 A | 9/1999 | Ma et al. |
| 5,959,975 A | 9/1999 | Sofman et al. |
| 6,006,084 A | 12/1999 | Miller et al. |
| 6,035,281 A | 3/2000 | Crosskey et al. |
| 6,047,268 A | 4/2000 | Bartoli et al. |
| 6,253,247 B1 | 6/2001 | Bhaskar et al. |
| 6,366,907 B1 | 4/2002 | Fanning et al. |
| 6,397,061 B1 | 5/2002 | Jordan et al. |
| 6,396,805 B2 | 7/2002 | Romrell |
| 6,415,271 B1 | 7/2002 | Turk et al. |
| 6,477,522 B1 | 11/2002 | Young |
| 6,522,735 B1 | 2/2003 | Fortman et al. |
| 6,653,933 B2 | 11/2003 | Raschke et al. |
| 6,751,196 B1 | 6/2004 | Hulyalkar et al. |
| 6,763,248 B1 | 7/2004 | Odamura |
| 6,810,428 B1 | 10/2004 | Larsen et al. |
| 6,850,764 B1 | 2/2005 | Patel |
| 6,879,574 B2 | 4/2005 | Naghian et al. |
| 6,941,378 B2 | 9/2005 | Apostolopoulos et al. |
| 6,954,616 B2 | 10/2005 | Liang et al. |
| 6,954,790 B2 | 10/2005 | Forslow |
| 6,961,575 B2 | 11/2005 | Stanforth |
| 6,975,613 B1 | 12/2005 | Johansson |
| 6,980,511 B1 | 12/2005 | Li et al. |
| 6,990,113 B1 | 1/2006 | Wang et al. |
| 7,016,375 B1 | 3/2006 | Rosenberg et al. |
| 7,028,096 B1 | 4/2006 | Lee |
| 7,043,225 B1 | 5/2006 | Patel et al. |
| 7,058,014 B2 | 6/2006 | Sim |
| 7,058,387 B2 | 6/2006 | Kumar et al. |
| 7,065,367 B2 | 6/2006 | Michaelis et al. |
| 7,075,890 B2 | 7/2006 | Ozer et al. |
| 7,085,281 B2 | 8/2006 | Thomas et al. |
| 7,089,301 B1 | 8/2006 | Labio et al. |
| 7,106,699 B2 | 9/2006 | Barri et al. |
| 7,130,283 B2 | 10/2006 | Vogel et al. |
| 7,174,385 B2 | 2/2007 | Li |
| 7,224,964 B2 | 5/2007 | Souissi et al. |
| 7,240,015 B1 | 7/2007 | Karmouch et al. |
| 7,257,632 B2 | 8/2007 | Zhang et al. |
| 7,274,658 B2 | 9/2007 | Bornstein et al. |
| 7,277,950 B1 | 10/2007 | Chapweske |
| 7,310,641 B2 | 12/2007 | Moore et al. |
| 7,340,759 B1 | 3/2008 | Rodriguez |
| 7,346,354 B2 | 3/2008 | Patel |
| 7,376,747 B2 | 5/2008 | Hartop |
| 7,401,153 B2 | 7/2008 | Traversat et al. |
| 7,440,573 B2 | 10/2008 | Lor et al. |
| 7,447,656 B2 | 11/2008 | Parthasarathy |
| 7,450,517 B2 | 11/2008 | Cho |
| 7,450,949 B2 | 11/2008 | Choksi |
| 7,460,549 B1 | 12/2008 | Cardei et al. |
| 7,463,890 B2 | 12/2008 | Herz et al. |
| 7,489,656 B2 | 2/2009 | Guo et al. |
| 7,530,102 B2 | 5/2009 | Moskowitz |
| 7,546,342 B2 | 6/2009 | Li et al. |
| 7,593,333 B2 | 9/2009 | Li et al. |
| 7,609,748 B2 | 10/2009 | Karlsson |
| 7,623,524 B2 | 11/2009 | Muthukrishnan et al. |
| 7,633,908 B1 | 12/2009 | Kwong et al. |
| 7,788,133 B2 | 8/2010 | Delenda |
| 7,817,623 B2 | 10/2010 | Dawson et al. |
| 7,830,834 B2 | 11/2010 | Das et al. |
| 7,949,593 B2 | 5/2011 | Norris |
| 8,249,984 B2 * | 8/2012 | Dawson ................ G06Q 20/10 |
| | | 348/581 |
| 8,360,784 B2 * | 1/2013 | Cardemon ................ G09B 1/00 |
| | | 434/236 |
| 8,416,689 B2 | 4/2013 | Davari et al. |
| 8,446,831 B2 | 5/2013 | Kwan et al. |
| 8,509,788 B2 | 8/2013 | Natarajan et al. |
| 9,037,508 B2 * | 5/2015 | Dawson ................ G06Q 40/00 |
| | | 370/338 |
| 10,419,360 B2 | 9/2019 | Dawson et al. |
| 2001/0000777 A1 | 5/2001 | McGregor et al. |
| 2001/0027484 A1 | 10/2001 | Nishi |
| 2001/0029182 A1 | 10/2001 | McCann et al. |
| 2001/0052133 A1 | 12/2001 | Pack et al. |
| 2001/0053152 A1 | 12/2001 | Sala et al. |
| 2002/0007328 A1 | 1/2002 | Hisamatsu et al. |
| 2002/0013767 A1 | 1/2002 | Katz |
| 2002/0029274 A1 | 3/2002 | Allen |
| 2002/0053033 A1 | 5/2002 | Cooper et al. |
| 2002/0053082 A1 | 5/2002 | Weaver, III et al. |
| 2002/0058499 A1 | 5/2002 | Ortiz |
| 2002/0061009 A1 | 5/2002 | Sorensen |
| 2002/0069278 A1 | 6/2002 | Forslow |
| 2002/0071477 A1 | 6/2002 | Orava |
| 2002/0075940 A1 | 6/2002 | Haartsen |
| 2002/0102987 A1 | 8/2002 | Souisse et al. |
| 2002/0110110 A1 | 8/2002 | Tiihonen et al. |
| 2002/0120873 A1 | 8/2002 | Salmivalli |
| 2002/0122410 A1 | 9/2002 | Kulikov et al. |
| 2002/0138414 A1 | 9/2002 | Baker, IV |
| 2002/0141358 A1 | 10/2002 | Requena |
| 2002/0144266 A1 | 10/2002 | Goldman et al. |
| 2002/0145978 A1 | 10/2002 | Batsell et al. |
| 2002/0161891 A1 | 10/2002 | Higuchi et al. |
| 2002/0161898 A1 | 10/2002 | Hartop et al. |
| 2002/0173272 A1 | 11/2002 | Liang et al. |
| 2002/0178261 A1 | 11/2002 | Chang et al. |
| 2003/0032433 A1 | 2/2003 | Daniel et al. |
| 2003/0037033 A1 | 2/2003 | Nyman et al. |
| 2003/0053493 A1 | 3/2003 | Graham Mobley et al. |
| 2003/0068975 A1 | 4/2003 | Qiao et al. |
| 2003/0088529 A1 | 5/2003 | Klinker et al. |
| 2003/0101267 A1 | 5/2003 | Thompson et al. |
| 2003/0117978 A1 | 6/2003 | Haddad |
| 2003/0120594 A1 | 6/2003 | Shaginaw et al. |
| 2003/0137976 A1 | 7/2003 | Zhu et al. |
| 2003/0139180 A1 | 7/2003 | Mcintosh et al. |
| 2003/0139990 A1 | 7/2003 | Greco |
| 2003/0153338 A1 | 8/2003 | Herz et al. |
| 2003/0235174 A1 | 12/2003 | Pichna et al. |
| 2003/0235175 A1 | 12/2003 | Naghian et al. |
| 2004/0006621 A1 | 1/2004 | Bellinson et al. |
| 2004/0022224 A1 | 2/2004 | Billhartz |
| 2004/0029553 A1 | 2/2004 | Cain |
| 2004/0030649 A1 | 2/2004 | Nelson et al. |
| 2004/0064351 A1 | 4/2004 | Mikurak |
| 2004/0078323 A1 | 4/2004 | Johnston et al. |
| 2004/0098329 A1 | 5/2004 | Tilton |
| 2004/0100929 A1 | 5/2004 | Garcia-Luna-Aceves |
| 2004/0128231 A1 | 7/2004 | Morita |
| 2004/0128262 A1 | 7/2004 | Nafousi |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0203820 A1 | 10/2004 | Billhartz |
| 2004/0203832 A1 | 10/2004 | An |
| 2004/0221319 A1 | 11/2004 | Zenoni |
| 2004/0260808 A1 | 12/2004 | Strutt |
| 2004/0264466 A1 | 12/2004 | Huang |
| 2005/0025172 A1 | 2/2005 | Frankel |
| 2005/0036475 A1 | 2/2005 | Nishiyama et al. |
| 2005/0042999 A1 | 2/2005 | Rappaport |
| 2005/0063419 A1 | 3/2005 | Schrader et al. |
| 2005/0080872 A1 | 4/2005 | Davis et al. |
| 2005/0111418 A1 | 5/2005 | Yang et al. |
| 2005/0153697 A1 | 7/2005 | Pate |
| 2005/0153725 A1 | 7/2005 | Naghian et al. |
| 2005/0157661 A1 | 7/2005 | Cho |
| 2005/0169209 A1 | 8/2005 | Miu et al. |

(56) References Cited

U.S. PATENT DOCUMENTS

| | | |
|---|---|---|
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0010031 A1 | 1/2006 | Higuchi |
| 2006/0034330 A1 | 2/2006 | Iwamura |
| 2006/0036475 A1 | 2/2006 | Gilfix et al. |
| 2006/0036518 A1 | 2/2006 | O'Neill |
| 2006/0059261 A1 | 3/2006 | Finkenzeller et al. |
| 2006/0085543 A1 | 4/2006 | Hrastar et al. |
| 2006/0095582 A1 | 5/2006 | Nitya et al. |
| 2006/0109787 A1 | 5/2006 | Strutt et al. |
| 2006/0114853 A1 | 6/2006 | Hasty, Jr. et al. |
| 2006/0126504 A1 | 6/2006 | Meier et al. |
| 2006/0167784 A1 | 7/2006 | Hoffberg |
| 2006/0176829 A1 | 8/2006 | Mclaughlin et al. |
| 2006/0179143 A1 | 8/2006 | Walker et al. |
| 2006/0187858 A1 | 8/2006 | Kenichi et al. |
| 2006/0193295 A1 | 8/2006 | White et al. |
| 2006/0205408 A1 | 9/2006 | Nakagawa et al. |
| 2006/0224502 A1 | 10/2006 | McGowan |
| 2006/0233377 A1 | 10/2006 | Chang et al. |
| 2006/0265508 A1 | 11/2006 | Angel et al. |
| 2006/0274214 A1 | 12/2006 | Carro |
| 2006/0294258 A1 | 12/2006 | Powers-Boyle et al. |
| 2007/0005797 A1 | 1/2007 | Fontijn et al. |
| 2007/0019771 A1 | 1/2007 | Ambuehl et al. |
| 2007/0117537 A1 | 5/2007 | Hui et al. |
| 2007/0121539 A1 | 5/2007 | Kikuchi |
| 2007/0124204 A1 | 5/2007 | de Boer et al. |
| 2007/0140272 A1 | 6/2007 | Gulliksson |
| 2007/0206528 A1 | 9/2007 | Walton et al. |
| 2007/0258359 A1 | 11/2007 | Ogasawara et al. |
| 2007/0291915 A1 | 12/2007 | Tseitlin et al. |
| 2007/0297436 A1 | 12/2007 | Sala et al. |
| 2007/0298764 A1 | 12/2007 | Clayton |
| 2008/0008140 A1 | 1/2008 | Forssell |
| 2008/0040481 A1 | 2/2008 | Joshi et al. |
| 2008/0104202 A1 | 5/2008 | Barrett et al. |
| 2008/0167982 A1 | 7/2008 | Leo et al. |
| 2008/0204448 A1 | 8/2008 | Dawson et al. |
| 2008/0232334 A1 | 9/2008 | Das et al. |
| 2008/0281529 A1 | 11/2008 | Tenenbaum et al. |
| 2008/0298283 A1 | 12/2008 | Dawson et al. |
| 2008/0298314 A1 | 12/2008 | Dawson et al. |
| 2008/0301017 A1* | 12/2008 | Dawson ............... G06Q 40/00 705/35 |
| 2009/0323587 A1 | 12/2009 | Trachewsky et al. |
| 2010/0008221 A1 | 1/2010 | Hong et al. |
| 2010/0114743 A1 | 5/2010 | Misraje et al. |
| 2010/0205116 A1 | 8/2010 | Erlanger |
| 2012/0117252 A1 | 5/2012 | Vasseur et al. |
| 2012/0124178 A1 | 5/2012 | Sparks |
| 2014/0279136 A1* | 9/2014 | Pacella ............... H04L 41/5029 705/26.3 |

FOREIGN PATENT DOCUMENTS

| | | |
|---|---|---|
| WO | 03037009 | 5/2003 |
| WO | 2004001585 | 12/2003 |
| WO | 2006004628 | 1/2006 |

OTHER PUBLICATIONS

Office Action dated Aug. 24, 2016, in U.S. Appl. No. 13/489,673; 7 pages.
IEEE 802.22, Wireless RANs, 220 pages, Mar. 2006.
Michelini et al., Spectral Sharing Across 2G-3G systems, IEEE, 5 pages, 2003.
Das et al, A Structured Channel Bowrrowing Scheme for Dynamic Load Balancing in Cellular Networks, IEEE, 8 pages, 1997.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Qui et al. "Bandwidth in Ad Hoc Networks: A Price-Based Approach," 2003, IEEE, pp. 1-10.
"ad hoc", http://www.thefreedictionary.com/Ad-hoc, Jul. 3, 2012, pp. 1-2.
Office Action from related U.S. Appl. No. 14/674,653 dated Dec. 17, 2016. 12 pages.
http://academic.safaribooksonline.com/0735614954, Microsoft Computer Directory, 3 pages, cited in U.S. Appl. No. 14/674,653 on Dec. 17, 2015.
http://www.webopedia.com, Search Results: "adhoc network", 2 pages, cited in U.S. Appl. No. 14/674,653 on Dec. 17, 2015.
http://www.webopedia.com, Search Results: "asynchronous network", 2 pages, cited in U.S. Appl. No. 14/674,653 on Dec. 17, 2015.
Notice of Allowance from U.S. Appl. No. 14/747,260 dated Feb. 1, 2016; 7 pages.
Office Action dated Apr. 21, 2016, in U.S. Appl. No. 11/755,800; 6 pages.
Notice of Allowance from U.S. Appl. No. 14/674,653 dated Sep. 27, 2016; 9 pages.
Office Action from U.S. Appl. No. 11/755,800 dated Oct. 14, 2016. 9 pages.
Office Action from U.S. Appl. No. 13/489,673 dated Jan. 25, 2017. 9 pages.
PTAB Decision on Appeal, from U.S. Appl. No. 11/755,782 dated Aug. 30, 2017; 11 pages.
Office Action, from U.S. Appl. No. 11/755,782 dated May 31, 2018; 19 pages.
Office Action in related U.S. Appl. No. 14/619,630 dated Dec. 28, 2018, 20 pages.
Final Office Action in related U.S. Appl. No. 11/755,782, dated Nov. 14, 2018, 26 pages.
Frodigh et al., "Wireless ad hoc networking—The art of networking without a network", Ericsson Review, No. 4, 2000, 16 pages. https://pdfs.semanticscholar.org/0e97/adc7bef883ab8a7f20ad997ebf007110c144.pdf accessed Jan. 28, 2019.
Notice of Allowance dated May 8, 2019 in related U.S. Appl. No. 11/755,800, 9 pages.
Office Action dated May 30, 2019 in related U.S. Appl. No. 14/619,630, 29 pages.
Notice of Allowance dated Aug. 21, 2019 in related U.S. Appl. No. 11/755,782, 19 pages.
Ziane, Saida; A Swarm Intelligent Scheme for Routing in Mobile Ad hoc Networks; Proceedings of the 2005 Systems Communications (ICW'05) (Year: 2005).
Notice of Allowance dated Aug. 27, 2019 in related U.S. Appl. No. 13/489,673, 10 pages.
Notice of Allowance dated Sep. 25, 2019 in related U.S. Appl. No. 14/619,630, 8 pages.
D. Zhu et al., "QoS Aware Wireless Bandwidth Aggregation (QAWBA) by Integrating Cellular and Ad-hoc Networks", Nov. 2004, IEEE Xplore, 8 pages.
D. Zhu et al., "Using Cooperative Multiple Paths to Reduce File Download Latency in Cellular Data Networks", 2005, IEEE, 7 pages.
Notice of Allowance dated Dec. 5, 2019 in related U.S. Appl. No. 11/755,782, 17 pages.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

Figure 4

# MARKET-DRIVEN VARIABLE PRICE OFFERINGS FOR BANDWIDTH-SHARING AD HOC NETWORKS

CROSS-REFERENCE TO RELATED APPLICATIONS

This application is related to the following applications, all of which are incorporated herein by reference in their entireties: application Ser. No. 11/755,808, published as U.S. Pub. No. 2008/0299988; application Ser. No. 11/755,780, published as U.S. Pub. No. 2008/0298327; application Ser. No. 11/755,775, published as U.S. Pub. No. 2008/0301017; and application Ser. No. 11/755,782, published as U.S. Pub. No. 2008/0300890.

FIELD OF THE INVENTION

The invention generally relates to methods and systems to establish and execute market-driven variable price offerings among the lenders and borrowers in a bandwidth-sharing ad hoc network for shared bandwidth usage.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

However, unless mechanisms exist to motivate network nodes (and their owners) to lend their excess bandwidth at any given moment, it may be difficult for borrowers to obtain the bandwidth needed for any given download.

Accordingly, there exists a need in the art to overcome the deficiencies and limitations described hereinabove.

SUMMARY OF THE INVENTION

In a first aspect of the invention, a method comprises establishing and executing market-driven variable price offerings among lenders and borrowers. A bandwidth-sharing ad hoc network for shared bandwidth usage is formed based on the established and executed market-driven variable price offering.

In another aspect of the invention, a method comprises requesting to borrow bandwidth from a lender and receiving acknowledgment as to whether there is a conflict. If there is a conflict, the conflict is resolved. The method further comprises establishing the ad hoc network when there is no conflict with the lender.

In another aspect of the invention, a method comprises providing a computer infrastructure being operable to establish and execute market-driven variable price offerings among lenders and borrowers. The method further comprises providing a computer infrastructure being operable to form a bandwidth-sharing ad hoc network for shared bandwidth usage.

In another aspect of the invention, a computer program product comprises a computer usable medium having readable program code embodied in the medium. The computer program product includes at least one component to establish and execute market-driven variable price offerings among lenders and borrowers to form a bandwidth-sharing ad hoc network for shared bandwidth usage.

BRIEF DESCRIPTION OF THE DRAWINGS

FIG. 4 shows an example table created and used in implementing aspects of the invention.

DETAILED DESCRIPTION OF EMBODIMENTS OF THE INVENTION

The invention generally relates to methods and systems to establish and execute market-driven variable price offerings among lenders and borrowers in a bandwidth-sharing ad hoc network for shared bandwidth usage. The present invention can be implemented in either a peer-to-peer environment or a multiplexed environment. In a multiplexed environment, the multiplexer may be either within the ad hoc network or outside of the ad hoc network.

By implementing the methods and systems of the invention, e.g., methods and systems to establish and execute market-driven variable price offerings among the lenders and borrowers in a bandwidth-sharing ad hoc network for shared bandwidth usage, multiple disparate wireless connections in conjunction with multiple devices using a variety of service providers, for example, can be used to create a single virtual fat pipe for transmission of data over a network. The individuals sharing their current connections, i.e., bandwidth, acting as gateway devices, are "lenders" of bandwidth; whereas, the individuals requiring additional bandwidth are "borrowers." By implementing the systems and methods of the invention, lenders are able to quickly establish, execute, and modify price offerings for bandwidth-sharing ad hoc networks.

System Environment

Figure 1:
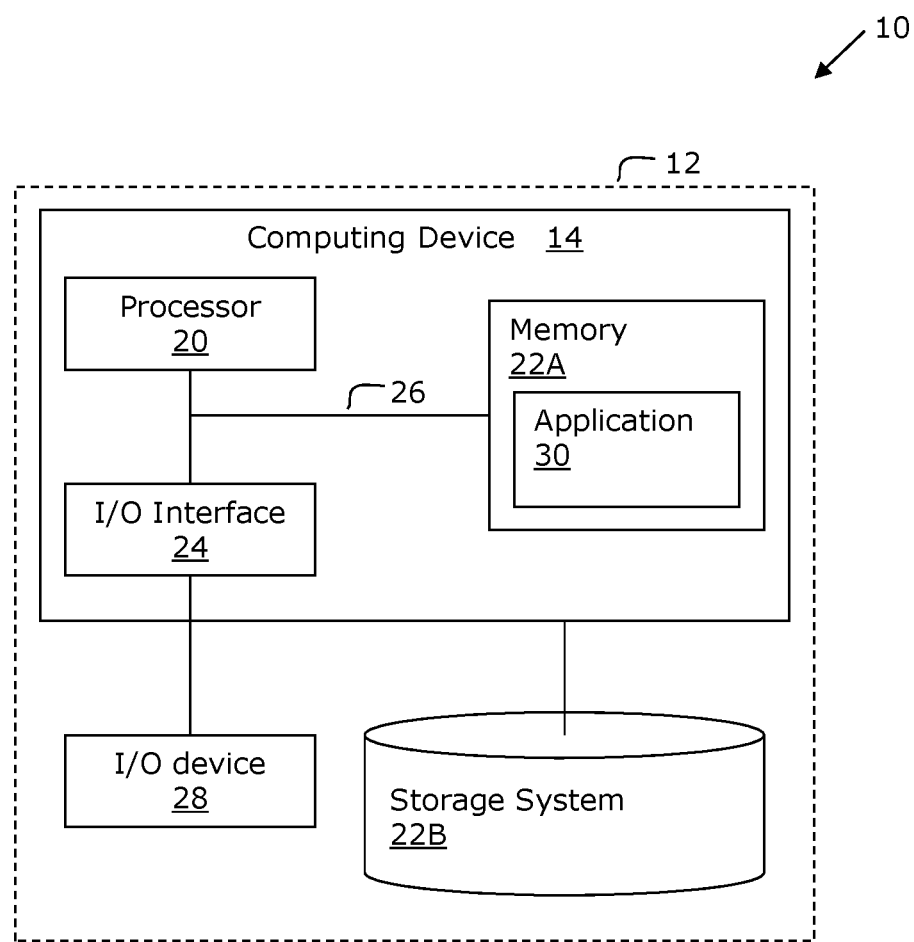
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform the methods and systems to establish and execute market-driven variable price offerings among the lenders and borrowers in a bandwidth-sharing ad hoc network for shared bandwidth usage, in accordance with the invention, e.g., the processes described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

By way of example, the service provider may provide market-driven variable price offering information according to the embodiments of the invention, and provide a table or other schema to a potential lender with the calculated price offering information in accordance with different market-driven variable pricing schemes. The table or other schema, for example, can be downloaded on a predetermined basis such as on a daily basis in order for the potential lender to set a market-driven variable price offering in accordance with the preset schemes in response to a borrower's request for bandwidth. For example, in embodiments, the service provider may provide average self-identified priorities of other nodes to a particular node. As explained further below, a node may utilize this information to determine a market price for shared bandwidth.

General Overview of Ad hoc Networks

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, market-driven variable price offerings for a lender to charge a borrower or borrowers for shared bandwidth usage in a bandwidth-sharing ad hoc network are determined. In embodiments, a potential lender may determine the price offerings for lending bandwidth to a borrower by offering a price and waiting for borrowers to accept the offered price. Additionally, in embodiments, a potential lender may determine the price offerings for lending bandwidth to a borrower by conducting an auction. Furthermore, in embodiments, a potential lender may determine the price offerings for lending bandwidth to a borrower by receiving each potential borrower's required criteria for their requested bandwidth and determining whose required criteria will command the highest price. Additionally, in embodiments, a potential lender may determine the price offerings for lending bandwidth to a borrower by sharing their bandwidth amongst all the potential borrowers and setting a price for each borrower proportional to their respective borrowed bandwidth. Further, in embodiments, a potential lender may determine the price offerings for lending bandwidth to a borrower by accounting for node affinities amongst the members of the bandwidth-sharing ad hoc network.

In order to utilize the market-driven price offerings for bandwidth-sharing ad hoc networks, an ad hoc network may be created between one or more borrower nodes and one or more lender nodes. This process may include both an initial discovery mechanism of the proposed role each node may play, and a negotiation and acceptance of the agreed price a lender may charge a borrower for lending bandwidth to the borrower.

Figure 2A:
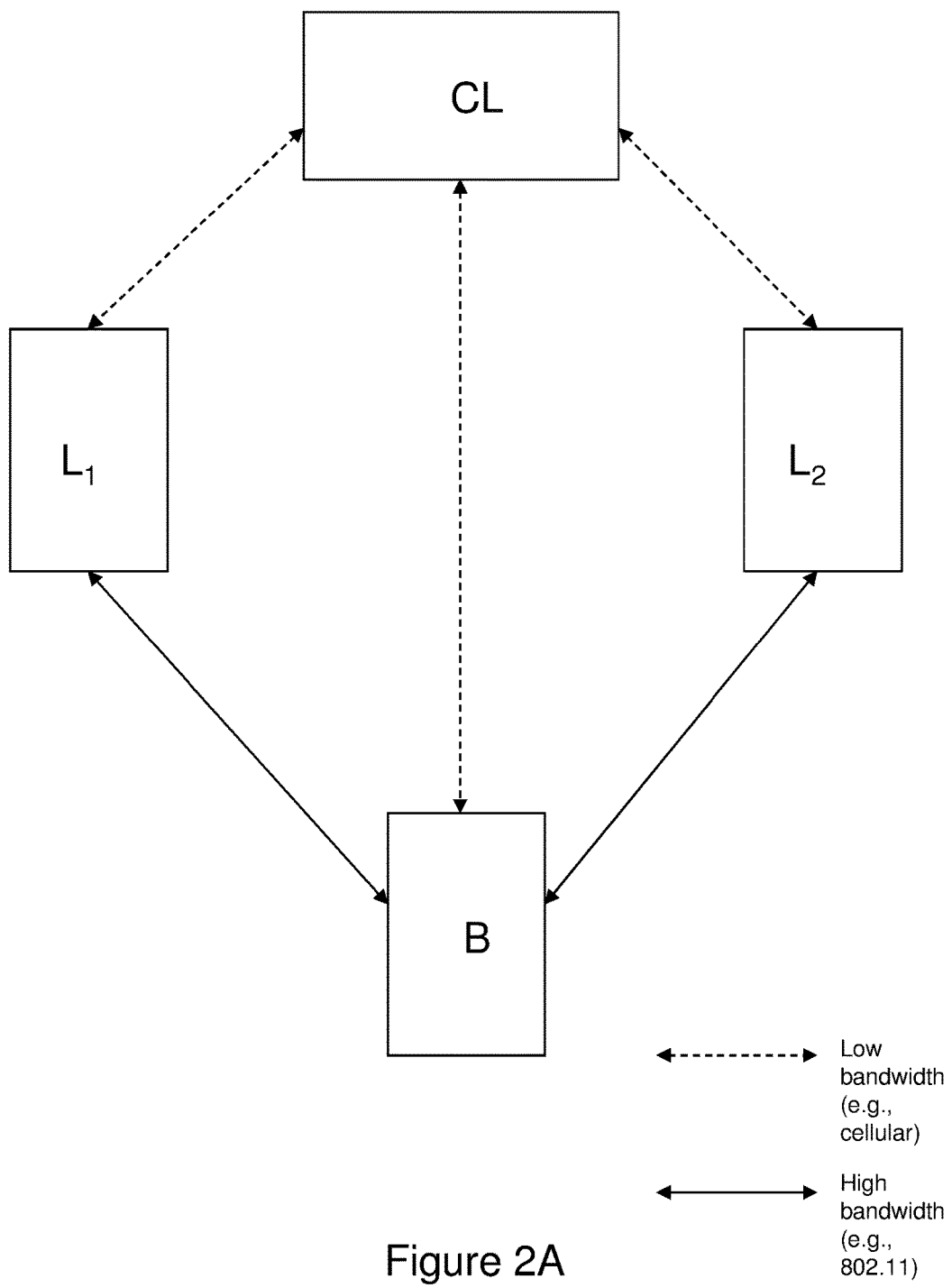
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in application Ser. No. 11/755,808.

In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
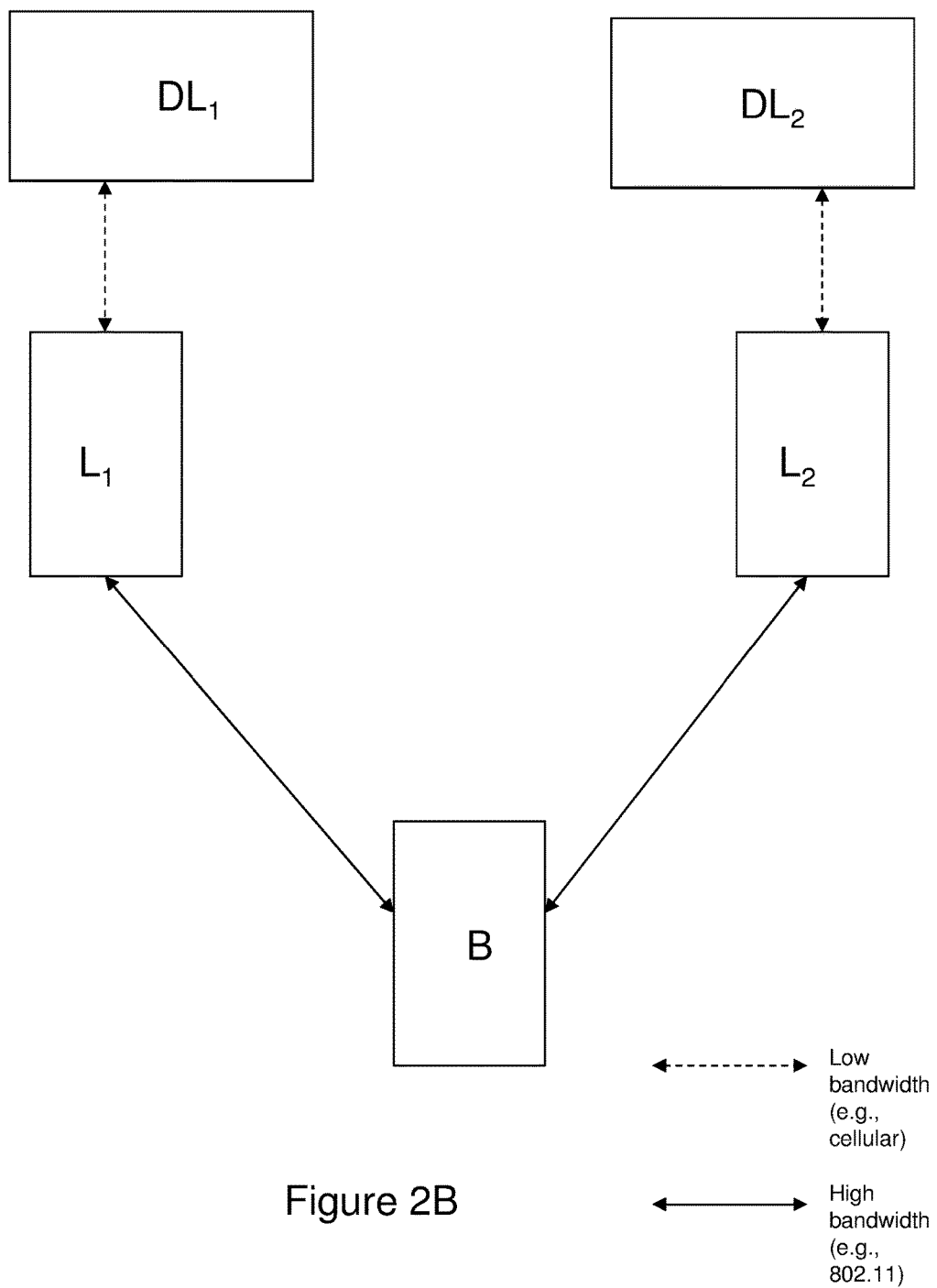
FIG. 2B is an overview of an alternative peer-to-peer ad hoc network.

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
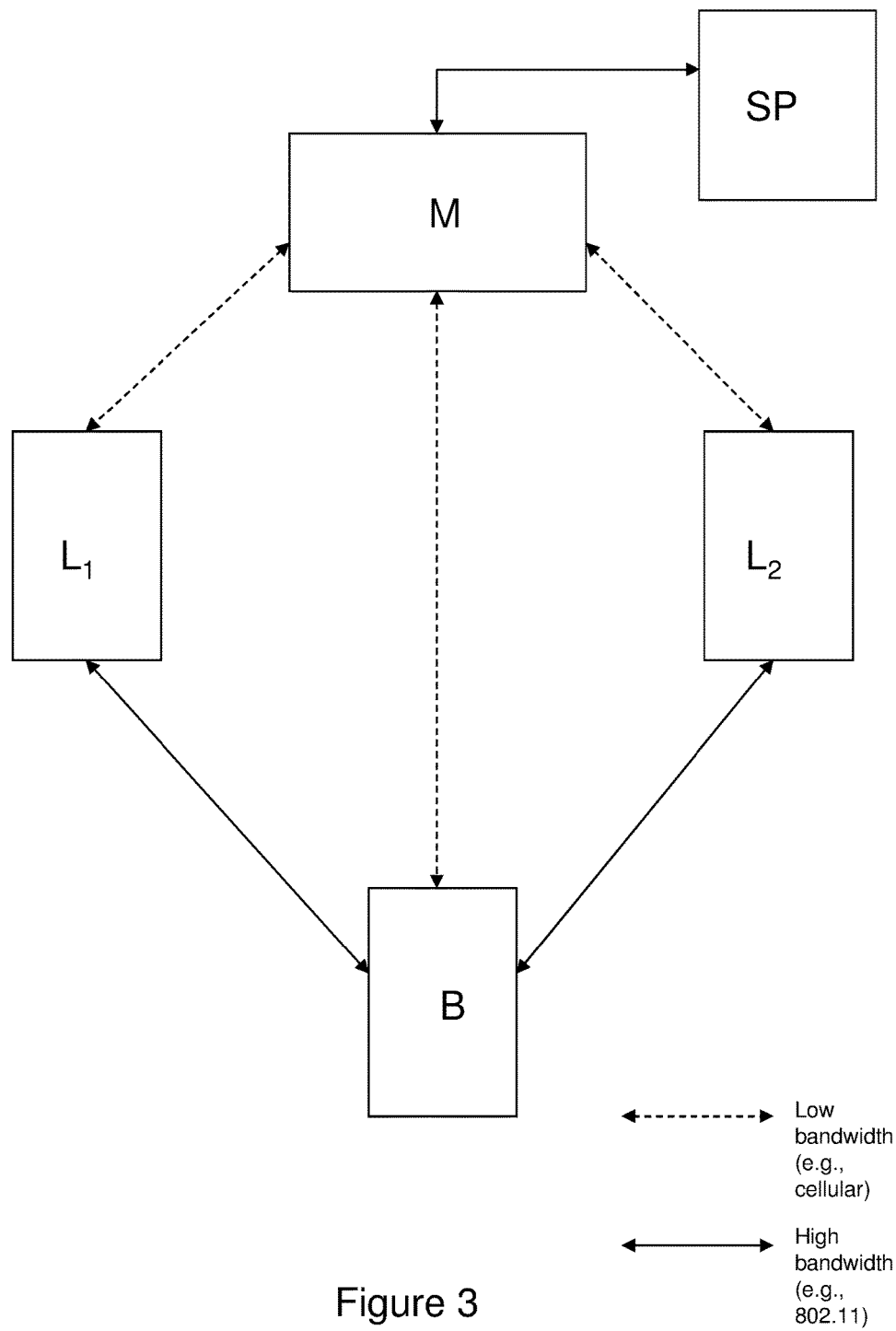
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth sharing architecture is set forth in application Ser. No. 11/755,780. In this implementation, a borrower B will request a multiplexer M to set up an ad-hoc network. The multiplexer M may communicate with a service provider SP and connect to one or more lenders, $L_1$ and $L_2$, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example.

Initial Formation of the Ad hoc Network

In order to form a new ad hoc network, a borrower may scan all available potential lenders and prioritize the potential lenders for a data transfer. The formation of the ad hoc network, in embodiments, may use a "borrower/lender" table as shown in FIG. 4. It is understood the table shown in FIG. 4 is one example of broadcasting bandwidth requests and obtaining lender information to select one or more lenders of bandwidth. For example, the table may take other formats, request additional information, etc. In this example, the borrower or multiplexer will broadcast the table to potential lenders which, in turn, will return the table, with information pertinent to the lender, to the borrower or the multiplexer. In alternative embodiments, a borrower, lender or multiplexer may broadcast data segments (subsets or supersets of data) rather than the entire table. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name or any other information that can uniquely describe the node. The "Node Type" column may describe whether this node is a borrower, a lender, or a multiplexer. The "Location" column may be an IP address, Wi-Fi address, Bluetooth® address, MAC address or any other attribute that can be used to locate the node. The "File Requested for Transfer" column may be used to store information about the file (or piece of file) to be transferred. This may be an HTTP address, an FTP address or other information to describe where and how the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally, the price may be stated as a number of minutes to be used in a wireless service plan or any other charging mechanism.

In aspects of the invention, a borrower and a lender may not see all of the "borrower/lender" table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. An illustrative formation and rearrangement of a bandwidth-sharing ad hoc network architecture is set forth in application Ser. No. 11/755,775.

In embodiments, a borrower completes one line of a new table to describe their node. At this stage, the node name, type, location and file requested columns may be completed. For example, as shown in TABLE 1, Borrower 1 would complete the table showing current location on a Wi-Fi Network called 'Airport', with IP address 192.168.2.3, to download a file from http://location.com/myfile. At this stage, the other columns may remain blank.

TABLE 1

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

The borrower broadcasts the table to request potential lenders to form an ad hoc network. This broadcast, in embodiments, includes the table for completion by any available nodes within range that could be used to form the ad hoc network. The table may be broadcast over the wireless network using a plurality of different protocols such as Bluetooth®, Wi-Fi or Cellular. The table can be represented in binary, xml, text or other data format optimized for the type of data transport.

A node receives the broadcast, including the table, and a potential lender completes necessary information in the table, including the price information. For example, as shown in TABLE 2, below, Lender 1 is a node on the same Wi-Fi network 'Airport' and is able to perform lender functions for $5/MB at a rate of 1 kb/second. The "File Requested for Transfer" column may remain blank, because the borrower has not yet decided which of the potential lenders will be part of the bandwidth-sharing ad hoc network. Additionally, the "Current Quality of Service" column may remain blank, because no bandwidth sharing has occurred yet.

TABLE 2

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |

Lender 1 may send back this information, including the pricing information, to Borrower 1. The filling and retransmitting of the table, may be repeated for other potential lenders of bandwidth in the ad hoc network. In this manner, the table may gradually be built up such that borrower can select lenders to use.

For example, as shown below in TABLE 3, additional nodes, Lender 2 and Lender 3, provided the information for each lender, and this information has been tabulated by the borrower, upon receipt. In this example, Lender 2 is on a Bluetooth® Network and can download the file requested for transfer at a price of $10/MB and a rate of 2 kb/second. Additionally, Lender 3, is on some other protocol, and can download the file requested for transfer at a price of $10/MB and a rate of 5 kb/second.

TABLE 3

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |
| Lender 2 | Lender | Bluetooth ® name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

To initiate the download, the borrower may determine, from the information in the table, including the price information, which lenders to use and for which portions of the data. The borrower may borrow bandwidth from the lenders to complete the download.

Market-Driven Variable Price Offerings

As in all of the embodiments, the descriptions of pricing methodologies described herein pertain to both multiplexed and non-multiplexed networks. With market-driven variable price offerings, consideration is given to the number of potential lenders or borrowers in a given ad hoc network area. In other words, the borrower may "play" competing lenders against each other, and the lenders may be working to ensure the highest prices for their offerings based on the number of borrowers.

In each case, the pricing policy may go into effect once a given mobile device, or node, has "decided" to become a lender, in response to the broadcasted table. The value of each price offering may be included in the wireless negotiations between devices, however, different implementations may be possible.

With the below disclosed embodiments, the node may be considered the node device or the user of the node, i.e., node user. The node device is the device being used to connect to others in the ad hoc network and lend or borrow bandwidth. The node user is the person using the node device. Additionally, while the invention is described in terms of downloading, in embodiments, a node may desire to upload data. The same analysis would apply for uploading data as it does to downloading data, as a node may still need to borrow bandwidth to accomplish the upload.

Architectural Scenarios

Offer and Wait

In embodiments, a lender node may determine a market-driven price to share bandwidth by making an offer and waiting for borrowers. In embodiments, this decision to offer and wait may be made in a transparent fashion, such that the node device "makes" the decision and executes the offer to share bandwidth without the node user's explicit action or knowledge.

In embodiments, an "offer and wait" action may be either unilateral or multilateral in nature. With a unilateral offer, a prospective lender node may offer bandwidth and await responses regardless of the quantitative offers being put forth by other prospective lenders in the bandwidth sharing ad hoc network. Conversely, with a multilateral offer, a potential lender node may take into account the quantitative pricing for shared bandwidth offers put forth by other prospective lenders in the ad hoc network. If, for example, other lender nodes are offering to share bandwidth for relatively higher prices, then a potential lender node may likewise put forth a higher price for lending bandwidth, but possibly marginally below other available offers. On the other hand, if the outstanding offers from other lender nodes are relatively low in price, then a potential lender node may put forth a correspondingly low price, or may decide to not make an offer to share bandwidth.

Auction

In embodiments, a potential lender node may use an auction method to determine a market-driven price to share bandwidth. In this respect, a potential lender node may announce an auction, then offer to share bandwidth for a specified price determined by the auction. The understanding for this methodology, vis-a-vis the "offer and wait," is that a price may be offered, and a short wait period may ensue. During this wait period, depending on implementation options, a bidding node may or may not be able to withdraw their offer without penalty. If a higher offer is received by the potential lender node during the wait period, another wait period may ensue, during which higher offers may be entertained. Depending on implementation options, the number of subsequent wait periods may be capped or uncapped. Once no higher offer follows, the highest offer may be accepted by the lender, and a bandwidth-sharing ad hoc network may be established.

While the auction has been described as potential borrowers bidding for shared bandwidth causing a price for shared bandwidth to rise, it should be understood that, in embodiments, the auction may be a reverse auction. In a situation where an ad hoc network has an oversupply of bandwidth lenders, the market may be considered a bandwidth borrower's market. In this situation, the lenders may bid to sell bandwidth. In this situation, the prices for shared bandwidth may decline as potential lenders under bid each other.

Additionally, while the auction was described as being publicized so that other lenders and borrowers could see incoming bids for shared bandwidth, in embodiments, the auction may be sealed. With a sealed auction, a potential borrower of bandwidth may not see the other potential borrowers' offers.

Other General Principles

In embodiments, the pricing of offers for shared bandwidth that occur under the auspices of these architectural principles may be in a variety of measurements and/or units. Either "offer and wait" or auction offerings may be executed for a variety of specified metrics, including but not limited to:

bandwidth (data volume/time) as an absolute measure for as long as the lender is in the network (e.g., MB/sec);
bandwidth (data volume/time) as an absolute measure for a fixed length of time (e.g., MB/sec);
data volume, provided the lender stays in the network (e.g., MB);
data volume, for a fixed unit of time (e.g., some number of MBs over the next ten minutes).

Furthermore, in embodiments, certain guarantees or stipulations may be made involving sharing of the bandwidth with other possible borrowers, depending on implementation options. Finally, in embodiments, compensation may be offered if the service levels fall short of the negotiated guarantees or stipulations, again depending on implementation options.

From a bandwidth borrower's perspective, in embodiments, a borrower node may elect to either take part in auctions or to only participate in "offer and wait" negotiations. With either of these options, in embodiments, a borrower node user may be actively engaged in the process. Alternatively, in embodiments, a borrower node device may take actions to accomplish the borrower node user's bandwidth goals in a transparent fashion. In embodiments, this may be accomplished through predefined definition of the node user's priorities, both in terms of download importance and cost sensitivity, as discussed in more detail below.

Conflict Scenarios

In embodiments, a conflict may arise when a borrower node requests to borrow bandwidth from a lender already engaged with another borrower node, when multiple borrower nodes simultaneously request to borrow bandwidth from the same available lender node, or when multiple borrower nodes simultaneously request to borrow bandwidth from the same lender already engaged with another borrower node. In embodiments, the processes described herein for handling simultaneous bandwidth sharing may be based firstly, on providing options for the borrowers to avoid the conflict, and secondly, on providing options for a multiplexer or a lender to handle the conflict if it occurs.

In embodiments, when a conflict scenario arises, the advantage may go to the lender node as the lender node has more bargaining power over each borrower node. In this situation, the lender may naturally seek to maximize the price for shared bandwidth. In contrast, borrowers may seek to minimize the costs and/or time required for using the shared bandwidth.

It is noted that "simultaneous" may be defined for the sake of this disclosure as an interval during which decision logic will base such offers as indistinguishable in time. Of course, in a finely granular race condition, any such offer will occur at some marginal instant before or after another. Even with this statement, given that such negotiations would occur in a high speed, short time-line fashion, it is recognized that intervals will exist during which offers are collected for "side by side" comparison. Offers coming in during such intervals may, for the sake of discussion, be considered simultaneous.

In embodiments, both multiplexed and peer-to-peer environments are considered. Within the multiplexed gateway environment, in embodiments, each borrower and lender may be registered with a multiplexing service provider prior to lending or borrowing bandwidth in a bandwidth-sharing ad hoc network. In embodiments, this may be a multiplexer within the ad hoc network or this may be a multiplexing service not within the ad hoc network.

In embodiments, in order for a borrower to obtain borrowed bandwidth from other nodes, the borrower node may scan the available lender nodes in the ad hoc network. The borrower node may submit a request to a multiplexer with a given lender node to which the borrower node would like to connect, or may submit a request directly to a lender node. In embodiments, the multiplexer or lender node may connect the borrower node and the lender node after the borrower agrees to the pricing terms and conditions set by the multiplexer on behalf of the requested lender node, or set by the lender node. However, a conflict may arise if the requested lender is already engaged, e.g., currently sharing bandwidth with another borrower. Additionally, a conflict may arise if more than one borrower simultaneously requests to borrow bandwidth from the same available lender node. Further, a conflict may arise if more than one borrower simultaneously requests to borrow bandwidth from the same currently unavailable lender node.

Conflict Scenario: Lender Node Engaged

In embodiments, with a first conflict scenario, a potential borrower requests to borrow bandwidth from a lender while the lender is currently unavailable, already sharing his bandwidth with another borrower. In this scenario, the lender may not be able to allow the potential borrower to join their bandwidth-sharing ad hoc network, because this may violate the terms and conditions that are agreed between the lender and the current borrower.

In embodiments, in a multiplexed environment, the multiplexer may act on behalf of the lender to ask if the potential borrower can wait until the current borrower is finished with the shared bandwidth. In embodiments, if the potential borrower's reply is "yes", then the potential borrower would wait, and the multiplexer may notify the potential borrower when the lender's bandwidth is available. If a potential borrower's reply is "no", then the potential borrower may attempt to borrow bandwidth from another lender in the ad hoc network. In embodiments, within a multiplexed environment, the lender node may not need to make any decision for either situation. Rather, the decisions may be performed by the multiplexer.

Alternatively, in embodiments in a peer-to-peer environment, the lender may ask if the potential borrower can wait until the current borrower is finished with the shared bandwidth. In embodiments, if the potential borrower's reply is "yes", then the potential borrower would wait, and the lender may notify the potential borrower when their bandwidth is available. If a potential borrower's reply is "no", then that potential borrower may try to borrow bandwidth from another lender in the ad hoc network.

Conflict Scenario: Simultaneous Bandwidth-Sharing Requests

In embodiments, with a second conflict scenario, multiple potential borrowers may request to borrow bandwidth from an available lender simultaneously. In embodiments, when each potential borrower submits a request to the multiplexer or lender to borrow bandwidth from the lender, the multiplexer or lender may acknowledge each borrower's request and determine a percentage of bandwidth that the lender is willing to lend and the amount of that bandwidth.

In the multiplexed environment, in embodiments, the lender may have determined pricing policies with the multiplexing service provider ahead of time. The predetermined pricing policies may give the multiplexer the authority to act on behalf of the lender for decision making and may help to automate the negotiation process.

In embodiments, multiple potential borrowers may submit simultaneous requests to the multiplexer or lender for borrowing bandwidth from the same lender. In embodiments, the multiplexer (in a multiplexed environment) or lender (in a peer-to-peer environment) may realize there is a conflict and may suggest each potential borrower attempt to borrow bandwidth from another lender in the ad hoc network. If any of the potential borrowers would like to try another lender, then those potential borrowers may withdraw their requests. In embodiments, in a peer-to-peer environment, no further lender action may be needed for those potential borrowers who have withdrawn their requests. Further, in embodiments, in a multiplexed environment, no further multiplexer action may be needed for those potential borrowers who have withdrawn their requests with regards to an agreement with the initially requested lender.

In embodiments, for the remaining potential borrowers who prefer to borrow from the requested lender notwithstanding the fact that there are multiple potential borrowers who are requesting to borrow bandwidth from the same lender, the multiplexer or lender may prompt each potential borrower to determine criteria for the bandwidth that is required. In embodiments, this criteria may be a determination of how much bandwidth is required. Alternatively, in embodiments, the criteria may be, e.g., Quality of Service stipulations.

In embodiments, the determination of how much bandwidth that is required may be a determination of a time of bandwidth-sharing each potential borrower needs from the lender. To determine a time of bandwidth sharing each potential borrower needs, in embodiments, each potential borrower may use the following equation:

$$\text{Time required} = \text{file size} / \text{Lender's bandwidth}. \quad (1)$$

The time required is the time required for each borrower, the file size is the size of the file the borrower would like to download, and the Lender's bandwidth is the bandwidth the Lender has available to share.

In embodiments, if each potential borrower knows their respective criteria for the bandwidth required (e.g., how much time is needed for a download), then the multiplexer or lender may arrange a bandwidth-sharing ad hoc network between the lender and the borrower with the criteria that will command the highest price. In embodiments, the criteria that may command the highest price may be the longest bandwidth usage need. Further, in embodiments, the criteria that may command the highest price may be the highest quality of service. Additionally, the criteria that may command the highest price may be a combination of criteria, e.g., a longest bandwidth usage need at the highest quality of service level. In embodiments, this is based on the principle of maximizing the lender's profit. For example, the longer the time a borrower uses the shared bandwidth, the more the borrower will pay the lender. Additionally, it is noted that the multiplexer or lender may make a determination as to which criteria may command the highest price by comparing potential borrowers' corresponding criteria (i.e., potential borrower A's bandwidth required with potential borrower B's bandwidth required).

If any of the potential borrowers does not know their criteria (e.g., how much time is needed to accomplish a download), the multiplexer or lender may not be able to predict the amount of compensation that the lender would make from each of the potential borrowers based on their respective required criteria, or which potential borrower's criteria may command the highest price. In this situation, in embodiments, the multiplexer or lender may give each of the potential borrowers the following options:

a) Start an auction;
    b) Share bandwidth with all the other requesters; and/or
    c) Withdraw the request.

With the first option, in embodiments, the potential borrower with the highest bid may win the opportunity to borrow bandwidth from the lender. With the second option, in embodiments, the lender's bandwidth may be divided amongst the number of potential borrowers. This may reduce the speed of bandwidth each borrower is lent, as compared to the situation of only one borrower using the lender's full available bandwidth. However, in embodiments, with the second option, the lender's price charged to each borrower may be reduced due to the reduced bandwidth each borrower is lent. With the third option, in embodiments, a potential borrower may withdraw their request and attempt to borrow bandwidth from another lender.

After the multiplexer or lender has received a choice of action for each potential borrower (i.e., auction, share or withdraw), the multiplexer or lender may allow those potential borrowers who would like to withdraw their requests to do so. Further, the multiplexer or lender may decide to carry out an auction as long as at least one of the potential borrowers has requested an auction. Alternatively, if none of the potential borrowers has requested an auction or withdrawn their request, then the lender's available bandwidth may be shared among all the remaining potential borrowers. In embodiments, with the sharing option, the lender's available bandwidth may be shared equally or unequally amongst the remaining borrowers.

For example, assume a lender has 1.5 Mbps of bandwidth, and is willing to share 60% (0.9 Mbps) of the bandwidth and reserve 40% of the bandwidth for its own use. Further, with this example, assume there are three potential borrowers. If each of the potential borrowers is willing to share the bandwidth at the same time, and none of the potential borrowers would like to withdraw their request or conduct an auction, each potential borrower may be given one third of the lender's shared bandwidth. With the above example, each borrower may borrow 0.3 Mbps of bandwidth from the lender. The price per minute of bandwidth usage may be less since each borrower is using only a portion of the lender's total available bandwidth.

Alternatively, if there is at least one potential borrower who has requested an auction, the multiplexer or lender may initiate an auction. In embodiments, the multiplexer or lender may set a starting bid, an incremental amount and a duration of the auction, which may be a relatively short period as compared to a traditional auction, e.g., a few seconds. Each potential borrower may place one or multiple bids until the auction ends. The multiplexer or lender may award the borrower with the highest bid the lender's available bandwidth.

Conflict Scenario: Hybrid

In embodiments, with a hybrid conflict scenario, multiple potential borrowers may simultaneously request to borrow bandwidth from a currently unavailable lender already engaged with a current borrower (or borrowers). This hybrid conflict scenario is a hybrid of the two above-described conflict scenarios. In embodiments, with this hybrid scenario, the multiple potential borrowers may wait until the lender's bandwidth is available, in a similar manner to the Lender Node Engaged conflict scenario. However, once the bandwidth is available to share, rather than initiating the bandwidth sharing with one borrower, according to the Lender Node Engaged conflict scenario, the multiplexer or lender may resolve the conflict according to Simultaneous Bandwidth-Sharing Requests conflict scenario, set forth above.

Flow Diagrams

The steps of the flow diagrams described herein may be implemented in the environment of FIG. 1. The flow diagrams may equally represent high-level block diagrams of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
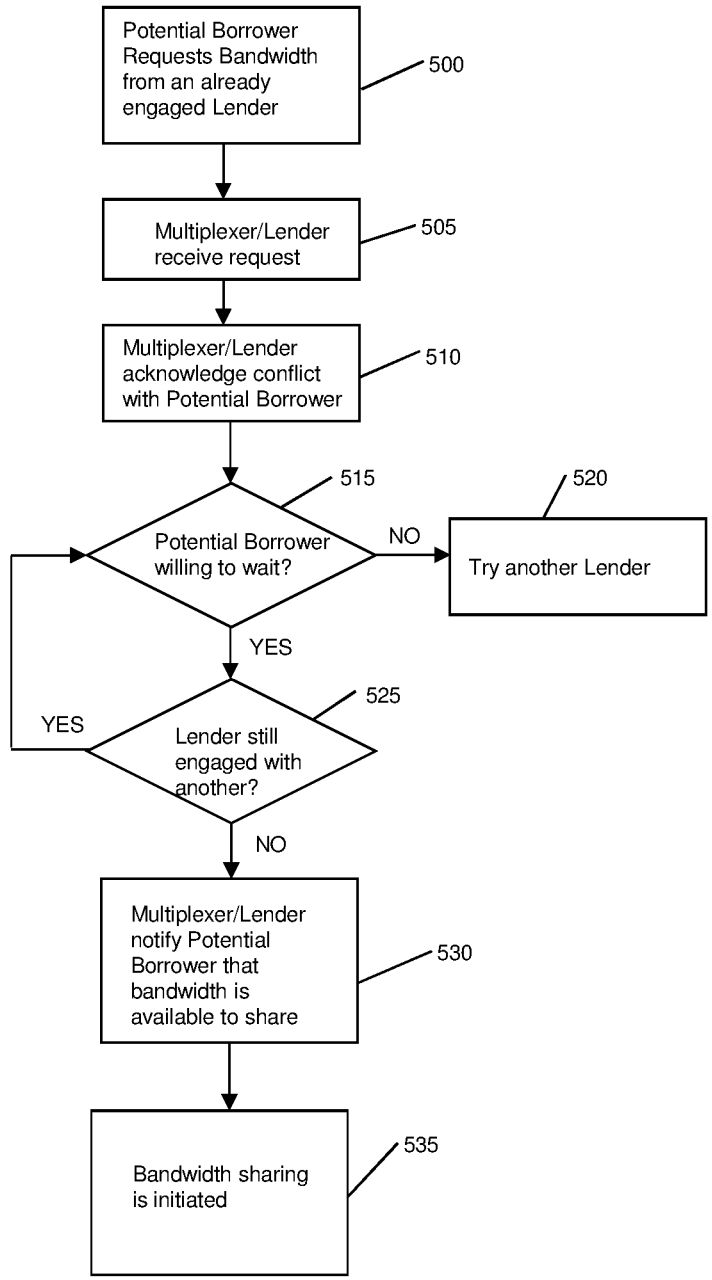
FIGS. 5-7 are flow charts of steps for implementing aspects of the invention.

FIG. 5 shows a flow chart for a resolution of the Lender Node Engaged conflict scenario, applicable in either a multiplexed or peer-to-peer environment. While the flow chart of FIG. 5 shows an order of steps, it is noted that these steps may be completed in a different order. At step 500, a potential borrower may request to borrow bandwidth from a lender already engaged with another current borrower. At step 505, either the multiplexer (in a multiplexed environment) or the lender (in a peer-to-peer environment) may receive the borrower's request. At step 510, the multiplexer or lender may acknowledge the conflict with the potential borrower. At step 515, the multiplexer or the lender may ask if the potential borrower is willing to wait until the lender is finished sharing bandwidth with the current borrower.

If the potential borrower is not willing to wait, at step 520, the potential borrower may try another lender. If, at step 515, the potential borrower is willing to wait, the potential borrower may wait a predetermined period of time. After passage of the period of time, at step 525, a determination may be made as to whether the lender is still engaged with the current borrower. If the lender is still engaged, at step 515, the multiplexer or the lender may again ask if the potential borrower is willing to wait until the lender is finished sharing bandwidth with the current borrower.

If, at step 525, the lender is no longer engaged with the current borrower, at step 530, the multiplexer or lender may notify the potential borrower that the lender's bandwidth is available to share. At step 535, bandwidth sharing may be initiated.

Figure 6:
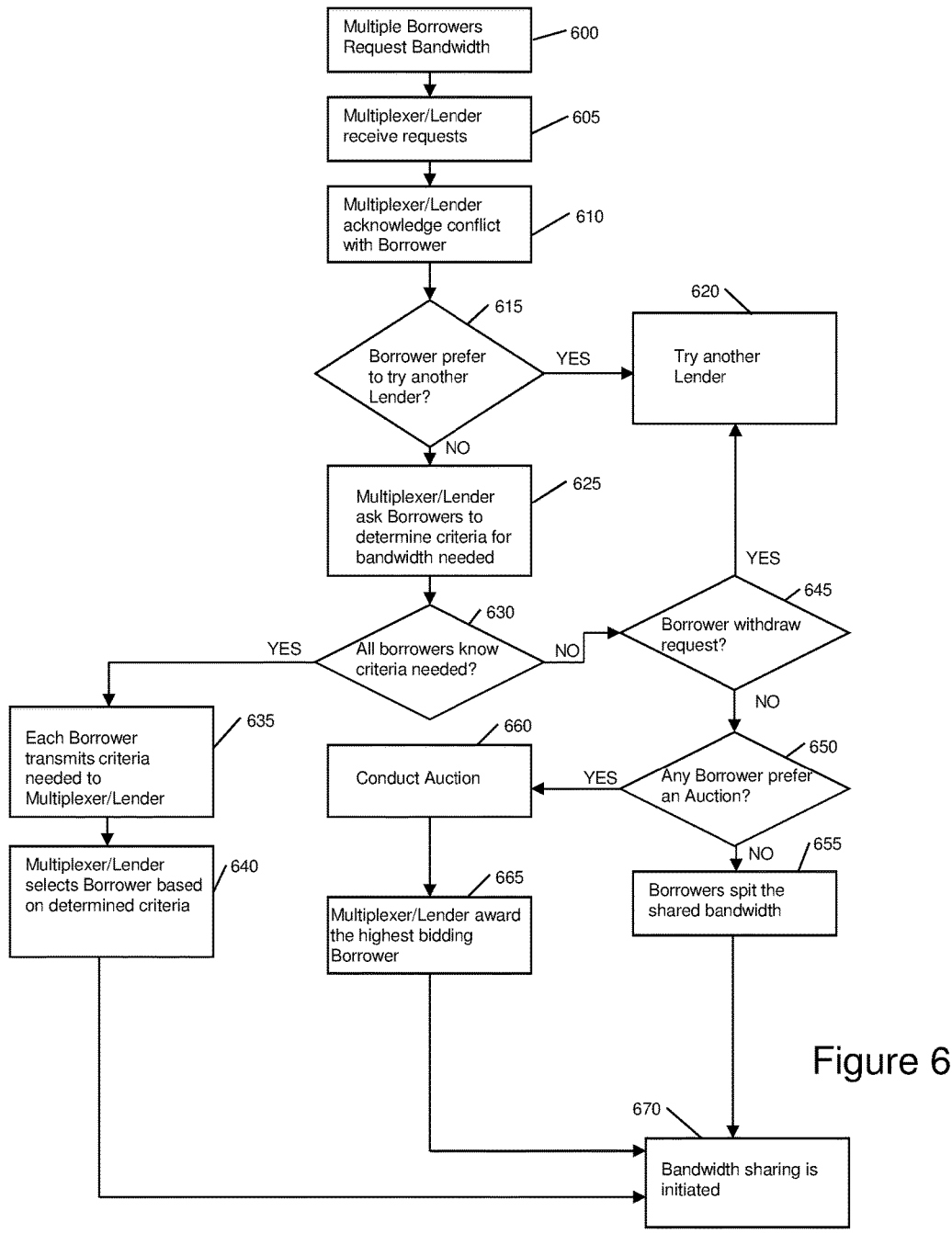

FIG. 6 shows a flow chart for a resolution of the Simultaneous Bandwidth-Sharing Requests conflict scenario, applicable in either a multiplexed or peer-to-peer environment. While the flow chart of FIG. 6 shows an order of steps, it is noted that these steps may be completed in a different order. At step 600, multiple potential borrowers may request to share bandwidth from an available lender. At step 605, either the multiplexer (in a multiplexed environment) or the lender (in a peer-to-peer environment) may receive the borrower's request. At step 610, the multiplexer or lender may acknowledge the conflict with each of the potential borrowers.

At step 615, the multiplexer or lender may ask each of the potential borrowers if they are willing to try to borrow bandwidth from another lender. If a potential borrower is willing to try another lender, at step 620, that borrower may try another lender. If a potential borrower is not willing to try another lender, at step 625, the multiplexer or lender may ask each of the remaining potential borrowers to determine their bandwidth-sharing criteria needed.

At step 630, a determination is made as to whether all of the remaining potential borrowers know the criteria for their bandwidth needs. If all of the remaining potential borrowers know the criteria for their bandwidth needs, at step 635, each remaining potential borrower may transmit their bandwidth criteria needs to the multiplexer or lender. At step 640, the multiplexer or lender may select a borrower based on the determined criteria. At step 670, bandwidth sharing may be initiated through the bandwidth-sharing ad hoc network.

If, at step 630, not all of the remaining potential borrowers know the criteria for their bandwidth needs, at step 645, the multiplexer or lender may ask each remaining potential borrower if they would like to withdraw their request for bandwidth. If a remaining potential borrower would like to withdraw their request, at step 620, that borrower may try to borrow bandwidth from another lender.

At step 650, for the remaining potential borrowers which would not like to withdraw, the multiplexer or lender may ask whether any potential borrower would like to request an auction. If any of the remaining potential borrowers requests an auction, at step 660, the multiplexer or lender may conduct an auction. At step 665, the multiplexer or lender may award the highest bidding potential borrower with the lender's lent bandwidth. At step 670, bandwidth sharing may be initiated through the bandwidth-sharing ad hoc network.

If at step 650, none of the remaining potential borrowers requests an auction, at step 655, the multiplexer or lender may split the lender's available bandwidth amongst the remaining potential borrowers. In embodiments, the splitting of the lender's available bandwidth may be an equal splitting. At step 670, bandwidth sharing may be initiated through the bandwidth-sharing ad hoc network.

Figure 7:
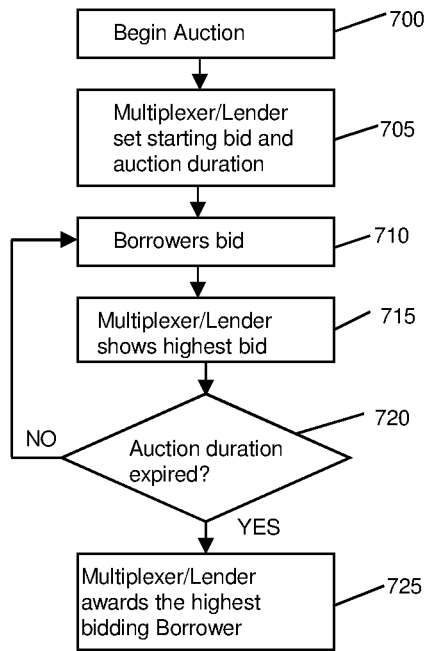

FIG. 7 shows a flow chart for conducting an auction. While the flow chart of FIG. 7 shows an order of steps, it is noted that these steps may be completed in a different order. At step 700, an auction may begin. At step 705, a multiplexer (in a multiplexed environment) or a lender (in a peer-to-peer environment) may set a starting bid and auction duration. Additionally, the multiplexer or lender may set a bid increment and a cap on the number of wait periods. At step 710, potential borrowers may submit a bid to the multiplexer or lender. At step 715, the multiplexer or lender may show the highest bid. As described above, in embodiments, the multiplexer or lender may show the highest bid to all participants in the auction. Additionally, in embodiments, the multiplexer or lender may show the highest bid only to the highest bidder. Alternatively, in embodiments, as described above, the multiplexer or lender may hold a blind auction, and not show the highest bid during the auction.

At step 720, a determination is made as to whether the auction duration has expired. Additionally, in embodiments, the multiplexer or lender may determine whether the number of wait periods has been exceeded. If the auction duration has not expired (or number of wait periods not been exceeded), at step 710, the potential borrowers may submit a bid to the multiplexer or lender. If the auction duration has expired (or number of wait periods been exceeded), at step 725, the multiplexer or lender may award the highest bidding potential borrower with the lender's available bandwidth.

In embodiments, with the hybrid conflict scenario, the multiple potential borrowers may wait until the lender's bandwidth is available, in a process similar that for the Lender Node Engaged conflict, shown in FIG. 5. However, once the bandwidth is available to share, rather than initiating the bandwidth sharing with one borrower, at step 535, the process may proceed to step 615 of FIG. 6 to resolve the Simultaneous Bandwidth-Sharing Requests conflict.

Role Bifurcation

In certain threshold conditions, in embodiments, node users and/or the node devices may decide to reverse their role from lender to borrower, or vice versa, based on, e.g., the dynamic market-driven price for borrowed bandwidth. These threshold conditions may arise because the highly fungible commodity of bandwidth is one which at any given instant can be either bought or sold by most or all nodes in the ad hoc network. For example, a node user who is performing frequent web page downloads may be saturating their native bandwidth functionality during 60% of any chosen time window. Under many circumstances, this node user may decide to acquire additional bandwidth, so as to speed their native downloads. However, under other circumstances, this same node user may decide that reversing their role, i.e., becoming a lender, is the appropriate course of action.

In embodiments, the spectrum of roles available makes certain presumptions about the relationship of a given node user to their own native (or lendable) bandwidth, as well as their relationship to other external (or borrowable) bandwidth. Relationships to native (or lendable) bandwidth include the following:
  will not lend native bandwidth at all, or will lend native bandwidth only if one's own usage is unimpeded (i.e., personal bandwidth usage has absolute priority);
  will lend native bandwidth only if the "price is right" (i.e., price sensitive); or
  will lend native bandwidth relatively freely (low personal bandwidth needs).
Analogously, relationships to external (or borrowable) bandwidth include the following:
  will borrow external bandwidth given any realistic cost (high bandwidth needs and cost insensitivity);
  will borrow external bandwidth only if the cost is right (cost sensitivity); or
  will not borrow external bandwidth (low bandwidth needs).

With the above context, it should be understood that as the market-driven price goes down, a given node may be more likely to become a borrower, and vice versa. Secondly, it is further understood that as a given node user's bandwidth need priority goes up, they may be more likely to become a borrower, and vice versa. Extrapolating this idea into a broader sphere, for any given ad hoc network, as the collective bandwidth priority increases, the number of borrowers increases. For example, a Monday morning commute with business people armed with mobile devices, or any crowd forming as breaking news is explored on these devices, may result in a scenario where the collective priority for data is high. Under such conditions, more borrowers may naturally be expected, so market-driven prices may rise. Conversely, under more placid conditions, the trend may reverse, more lenders may appear in the network, and the market-driven prices may decline.

From the above description, it is understood that a valuable piece of the bandwidth-sharing architecture is to allow each node user to select/adjust both their cost-sensitivity and bandwidth priority on their mobile device. In embodiments, this may be accomplished via a single sliding scale ("give me my data now" versus "I want to save/make money"). Alternatively, in embodiments, this may be accomplished via two separate sliding scales. Given this metric for each user, the associated mobile device may self-adapt according to the broader group dynamics. If the cost/price of bandwidth increases, and if a node user's self-identified bandwidth need priority is less than an average self-identified priority, the node may decide to change their role from a borrower to a lender. In embodiments, definition of such priorities may be made in advance, so that the decision processes reached by the node devices may be automated, and either transparent or near-transparent (e.g., a subtle notification provided only that a change had occurred) to the node user. Additionally, in embodiments, a multiplexing service provider or central server may serve as a central register or a clearing house of information, e.g., maintaining and providing, e.g., average self-identified priorities of other nodes. Additionally, in embodiments, these settings may also include options to "remain a borrower no matter what external factors are at play," or "remain a lender no matter what external factors are at play."

Furthermore, in embodiments, sensitivities to bandwidth sharing may be prioritized by functionality. If, for example, a particular node user deemed email of high priority and web surfing of low priority, then these preset scales may be adjusted to ensure that either bandwidth sharing or borrowing followed these priorities in periods of active time for each activity. In this capacity, the requesting program, e.g., an email program, web browser, or media player, could help determine the prioritization of bandwidth borrowing or lending.

Further, in embodiments, a node user may define web domains that occupy high priorities. For example, a node user who frequently streams audio from a given website, may decide that this is a high-priority domain and that bandwidth sharing or borrowing should reflect this priority. Conversely, a web page download from a news site, may constitute a low priority, such that bandwidth sharing or borrowing when engaging with this domain should likewise be prioritized accordingly.

Multi-Tiered, Affinity-Sensitive Service Classes

In embodiments, multiple tiers of service or prices may be offered depending on whether the borrower and lender nodes have some affinity, e.g., use the same service provider. In embodiments, the term service provider refers to a wireless service provider and/or a multiplexing service provider. In embodiments, several affinity-sensitive options may exist.

With a first option, in embodiments, a lender node may charge a lower price, or nothing, for lending bandwidth to borrowers of same service provider. With this option, a borrower node may experience reduced or absent prices when they borrow bandwidth from a lender node of either a common wireless service provider or a common multiplexing service provider.

With a second option, in embodiments, a lender node may only share bandwidth with other nodes of a same service provider if a conflict arises, as discussed above. With this option, regardless of market-driven pricing, node users of either a common service provider or a common multiplexer service may only share bandwidth with each other in the event a conflict between potential borrowers.

With a third "affinity insensitive" option, in embodiments, a lender node may charge a same price to all borrowers. With this option, all borrower nodes may experience the same market-driven prices and the same competitive constraints and opportunities in the bandwidth-sharing market, regardless of their respective affinities, e.g., service providers.

With a fourth option, in embodiments, a lender node may charge a lower price, or nothing, to borrower nodes of self-defined affinities. Though this option may be most applicable to the peer-to-peer (P2P) sharing architectures, it may also be applied to multiplexing architectures. With this option, nodes of a common background or organizational membership, e.g., AAA, IEEE, a political affiliation, or a simple grassroots "bandwidth co-op" may offer and receive reduced bandwidth-sharing rates to and from each other.

With a fifth option, in embodiments, a lender node may charge a lower price, or nothing, based on corporate or organizational underwriting. With this option, in embodiments, websites may provide compensation to ensure downloads of their content. For example, a news network may underwrite its content, so that node users of a particular service provider may download associated content through bandwidth-sharing ad hoc networks at reduced prices. A purpose of this subsidization may be to increase readership, vis-a-vis competitors, which may then allow the website (e.g., the news network) to command greater advertising rates.

With a sixth option, in embodiments, a lender node may charge a lower price, or nothing, based on affinities of access points, or retail points which offer wireless connections. For example, in a crowded urban environment, numerous 802.11 access points may exist in close proximity, e.g., a coffee house, a bookstore, and a brew pub. With this option, customers at the coffeehouse, using the coffeehouse access point, may be able to share bandwidth amongst themselves. Further, these customers may be able to share bandwidth amongst themselves at lower prices. However, the coffeehouse may prevent the coffeehouse customers from sharing bandwidth with customers of a neighboring business (e.g., the bookstore and brew pub) by not allowing those customers of a neighboring business to tap through the coffeehouse access point. Likewise, the bookstore and the brew pub may limit the sharing of bandwidth using their respective access points to those customers in their respective establishments. Additionally, in embodiments, the access points (e.g., the coffeehouse, the bookstore and brew pub) may allow bandwidth sharing between nodes utilizing different access points, but at non-reduced prices.

With a seventh option, in embodiments, a node user may construct hybrid plans, based upon combinations of the market-insensitive price options disclosed in application Ser. No. 11/755,782, as well as the above disclosed options. In embodiments, a borrower may experience free or reduced prices for shared bandwidth if considered "in network" with a same service provider as the borrower, but subject to data volume charges if using a different service provider. In another example, users of the same multiplexer service may not be subject to time-of-day pricing variations; whereas those with a different multiplexer service may pay such varying rates.

While the invention has been described in terms of embodiments, those skilled in the art will recognize that the invention can be practiced with modifications and in the spirit and scope of the appended claims.

What is claimed is:

1. A method of establishing a bandwidth-sharing ad hoc network, comprising:
   scanning, by a borrower node, potential lender nodes;
   requesting, by the borrower node, to borrow bandwidth from a lender node of the potential lender nodes;
   receiving, by the borrower node, acknowledgment indicating a conflict between the borrower node and the lender node;
   resolving the conflict; and
   initiating bandwidth sharing using the bandwidth-sharing ad hoc network when the conflict is resolved,
   wherein the borrower node is a mobile computing device of a bandwidth borrower;
   the lender node is a mobile computing device of a bandwidth lender;
   the bandwidth-sharing ad hoc network is a communication network amongst the mobile computing device of the bandwidth lender and the mobile computing device of the bandwidth borrower; and
   the bandwidth-sharing ad hoc network is configured such that the mobile computing device of the bandwidth borrower and the mobile computing device of the bandwidth lender are in communication with one or more remote locations via wireless telephony communication protocol, the mobile computing device of the bandwidth lender is in communication with the mobile computing device of the bandwidth borrower via local wireless communication protocol, and the mobile computing device of the bandwidth lender selectively lends bandwidth to the mobile computing device of the bandwidth borrower for downloading data from or uploading data to the one or more remote locations.

2. The method of claim 1, wherein the conflict is the lender node being currently engaged with lending bandwidth to another borrower node, and the resolving the conflict comprises:
   the borrower node indicating to the lender node that the borrower node is willing to wait;
   the borrower node waiting for the lender node to become available; and
   the borrower node receiving an indication from the lender node that the lender node is available to lend bandwidth to the borrower node.

3. The method of claim 1, wherein the conflict is potential borrowers, including the borrower node and at least one other borrower node, simultaneously requesting to borrow bandwidth from the lender node, and the resolving the conflict comprises at least one of:
- the potential borrowers trying another lender;
- the potential borrowers determining bandwidth criteria;
- the potential borrowers requesting an auction; and
- the potential borrowers splitting available bandwidth of the lender.

4. The method of claim 3, further comprising transmitting determined bandwidth criteria to a multiplexer or the lender.

5. The method of claim 4, wherein the multiplexer or the lender selects a borrower based on determined bandwidth criteria.

6. The method of claim 3, further comprising any of remaining potential borrowers requesting the auction to establish the ad hoc network.

7. The method of claim 6, further comprising a multiplexer or the lender conducting the auction.

8. The method of claim 7, wherein the conducting the auction comprises at least one of the multiplexer or lender:
- setting a beginning bid;
- setting at least one of an auction duration and a cap on a number of wait periods;
- setting a bid increment; and
- showing a highest bid to at least one of all bidding nodes, a highest bidding node, and none of the bidding nodes.

9. The method of claim 1, wherein the scanning comprises the borrower node broadcasting a borrower/lender table.

10. The method of claim 9, wherein the broadcasting comprises broadcasting the entire borrower/lender table.

11. The method of claim 9, wherein the broadcasting comprises broadcasting the data segments of the borrower/lender table.

12. The method of claim 9, further comprising:
- the borrower node receiving user input defining a file requested for download; and
- the borrower node automatically generating the borrower/lender table based on the receiving the user input, wherein the broadcasting a borrower/lender table is performed after the borrower node automatically generates the borrower/lender table.

13. The method of claim 9, further comprising the borrower node receiving the borrower/lender table from the lender node after the broadcasting.

14. The method of claim 13, wherein the borrower/lender table received from the lender node includes information about the lender node.

15. The method of claim 14, wherein the information about the lender node includes a location of the lender node and a bandwidth sharing price per data unit.

16. The method of claim 15, wherein the location of the lender node includes an IP address of the lender node.

17. The method of claim 1, wherein the local wireless communication protocol comprises at least one selected from the group consisting of: IEEE (Institute of Electrical & Electronics Engineers) 802.11a, IEEE (Institute of Electrical & Electronics Engineers) 802.11b, IEEE (Institute of Electrical & Electronics Engineers) 802.11g, IEEE (Institute of Electrical & Electronics Engineers) 802.15.1, and IEEE (Institute of Electrical & Electronics Engineers) 802.15.4.

18. The method of claim 1, wherein the wireless telephony communication protocol comprises at least one selected from the group consisting of: EV-DO (Evolution-Data Optimized), CDMA (Code Division Multiple Access), EDGE (Enhanced Data Rates for Global Execution), and GPRS (General Packet Radio Service).

19. The method of claim 1, wherein:
- the wireless telephony communication protocol comprises at least one selected from the group consisting of: EV-DO (Evolution-Data Optimized), CDMA (Code Division Multiple Access), EDGE (Enhanced Data Rates for Global Execution), and GPRS (General Packet Radio Service); and
- the local wireless communication protocol comprises at least one selected from the group consisting of: IEEE (Institute of Electrical & Electronics Engineers) 802.11a, IEEE (Institute of Electrical & Electronics Engineers) 802.11b, IEEE (Institute of Electrical & Electronics Engineers) 802.11g, IEEE (Institute of Electrical & Electronics Engineers) 802.15.1, and IEEE (Institute of Electrical & Electronics Engineers) 802.15.4.

20. The method of claim 1, wherein the initiating the bandwidth sharing using the bandwidth-sharing ad hoc network comprises:
- using the bandwidth-sharing ad hoc network as a single virtual fat pipe for transmission of data between (1) the mobile computing device of the bandwidth borrower and (2) the one or more remote locations.

* * * * *